US011411964B1

(12) United States Patent
Reich et al.

(10) Patent No.: US 11,411,964 B1
(45) Date of Patent: Aug. 9, 2022

(54) SECURITY SYSTEMS AND METHODS FOR IDENTITY VERIFICATION AND SECURE DATA TRANSFER

(71) Applicant: TRACELESS.IO, Newburgh, NY (US)

(72) Inventors: Gene Reich, Newburgh, NY (US); Peter Segerstrom, Los Angeles, CA (US)

(*) Notice: Subject to any disclaimer, the term of this patent is extended or adjusted under 35 U.S.C. 154(b) by 0 days.

(21) Appl. No.: 17/724,018

(22) Filed: Apr. 19, 2022

(51) Int. Cl.
*H04L 29/06* (2006.01)
*H04L 9/40* (2022.01)
*G06F 21/62* (2013.01)

(52) U.S. Cl.
CPC ............ *H04L 63/126* (2013.01); *G06F 21/62* (2013.01); *H04L 63/083* (2013.01)

(58) Field of Classification Search
CPC ......... G06F 21/31; G06F 21/62; H04L 63/126
See application file for complete search history.

(56) References Cited

U.S. PATENT DOCUMENTS

| 10,268,817 | B1* | 4/2019 | Pham ................... G06F 21/6227 |
| 2014/0053251 | A1* | 2/2014 | Chen ....................... G06F 21/33 726/6 |
| 2016/0117499 | A1* | 4/2016 | Roy ........................ G06F 21/31 726/6 |
| 2017/0142080 | A1* | 5/2017 | Hill ........................ G06F 21/45 |
| 2017/0163471 | A1* | 6/2017 | Zheng .................... G06F 21/45 |

* cited by examiner

*Primary Examiner* — Jason K Gee
(74) *Attorney, Agent, or Firm* — Carter, DeLuca & Farrell LLP; George Likourezos (57) ABSTRACT

A method for sending sensitive information includes: receiving, by a service provider, a request for sensitive information from a user; upon receipt of the request, sending, by a security provider, a security code to the user; receiving, by the service provider, a code from the user; verifying, by the service provider, the user when the received code matches the security code; sending, by the service provider, the sensitive information to the security provider after the user is verified; and providing, by the security provider, a sensitive data link to the user. The sensitive data link includes the sensitive information and may expire after the sensitive data link is viewed once.

20 Claims, 5 Drawing Sheets

SECURITY SYSTEMS AND METHODS FOR IDENTITY VERIFICATION AND SECURE DATA TRANSFER

FIELD

This disclosure generally relates to security systems and methods for identity verification and secure data transfer and, in particular, to systems and methods for sending a security data link for identity verification and secure data transfer.

BACKGROUND

Personal/business/government information has been accessible via the internet and exposed to potential hacking and cracking. Passwords and other security means have been developed to protect the information. Due to the increase in registered websites, users have to remember more and more passwords. Further, websites require different requirements for passwords and regular changes to passwords. Thus, complexity and difficulties have increased burdens on the users in remembering passwords. Moreover, users who try to make changes to the sensitive information, have to be verified as authorized users.

Further, when data is to be transmitted, security measures are needed to verify the recipient so as to make sure that the data is not transmitted to anyone other than the recipient, and not to remain accessible after the recipient receives the data.

SUMMARY

This disclosure generally relates to security systems and methods for sending a sensitive data link for identity verification and secure data transfer. When a user forgets sensitive information or needs to modify, change, or update sensitive information, such as passwords to a website, safety and security measures are needed to verify the users so that others are prevented from changing or modifying the sensitive information. Further, when sensitive data is to be transmitted, the sensitive data should be protected from others before and after the intended user receives the data. The security systems and methods of the present disclosure provide such safety and security measures.

According to various aspects of the present disclosure, a method for sending sensitive information includes: receiving, by a service provider, a request for sensitive information from a user; upon receipt of the request, sending, by a security provider, a security code to the user; receiving, by the service provider, a code from the user; verifying, by the service provider, the user when the received code matches the security code; sending, by the service provider, the sensitive information to the security provider after the user is verified; and providing, by the security provider, a sensitive data link to the user. The sensitive data link includes the sensitive information and expires after the sensitive data link is viewed once.

In various aspects, the sensitive information is not accessible when the sensitive data link is expired.

In various aspects, the security code may be sent to the user via an email, short message service, or service ticket. The code may be sent via the service ticket to an email address outside of the service provider.

In various aspects, the sensitive data link may expire after a duration selected by the service provider.

In various aspects, the sensitive data link may include a password to access the sensitive information. The password may be sent to the user separately from the sensitive data link.

In various aspects, the method may further include creating, by the security provider, the sensitive data link to a third party different from the service provider and the security provider. The sensitive information may be temporarily saved at the third party while the sensitive data link is not expired.

According to various aspects of the present disclosure, a security system is disclosed for sending sensitive information. The security system includes a security provider configured to send a security code to a user, and send a sensitive data link to the user and a service provider. The service provider includes a memory including one or more programs and a processor configured to execute the one or more programs to receive a request for sensitive information from the user, verify the user when a code received from the user matches the security code, and send the sensitive information to the security provider after the user is verified. The sensitive data link includes the sensitive information and is expired after the sensitive data link is viewed once.

According to various aspects of the present disclosure, a non-transitory computer-readable medium includes one or more programs that, when executed by a computer, perform a method for sending sensitive information. The method includes: receiving a request for sensitive information from a user; upon receipt of the request, sending, by a security provider, a security code to the user; receiving a code from the user; verifying the user when the received code matches the security code; sending the sensitive information to the security provider after the user is verified; and providing, by the security provider, a sensitive data link to the user. The sensitive data link includes the sensitive information and expires after the sensitive data link is viewed once.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Various aspects are illustrated in the accompanying figures with the intent that these examples are not restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. The figures are listed below.

DETAILED DESCRIPTION

Systems and methods as described below in this disclosure provides identity verification and secure data transfer to prevent unverified or unauthorized users from changing sensitive information (e.g., password or passcode to secure information, etc.) and to prevent unverified or unauthorized transmission.

Figure 1:
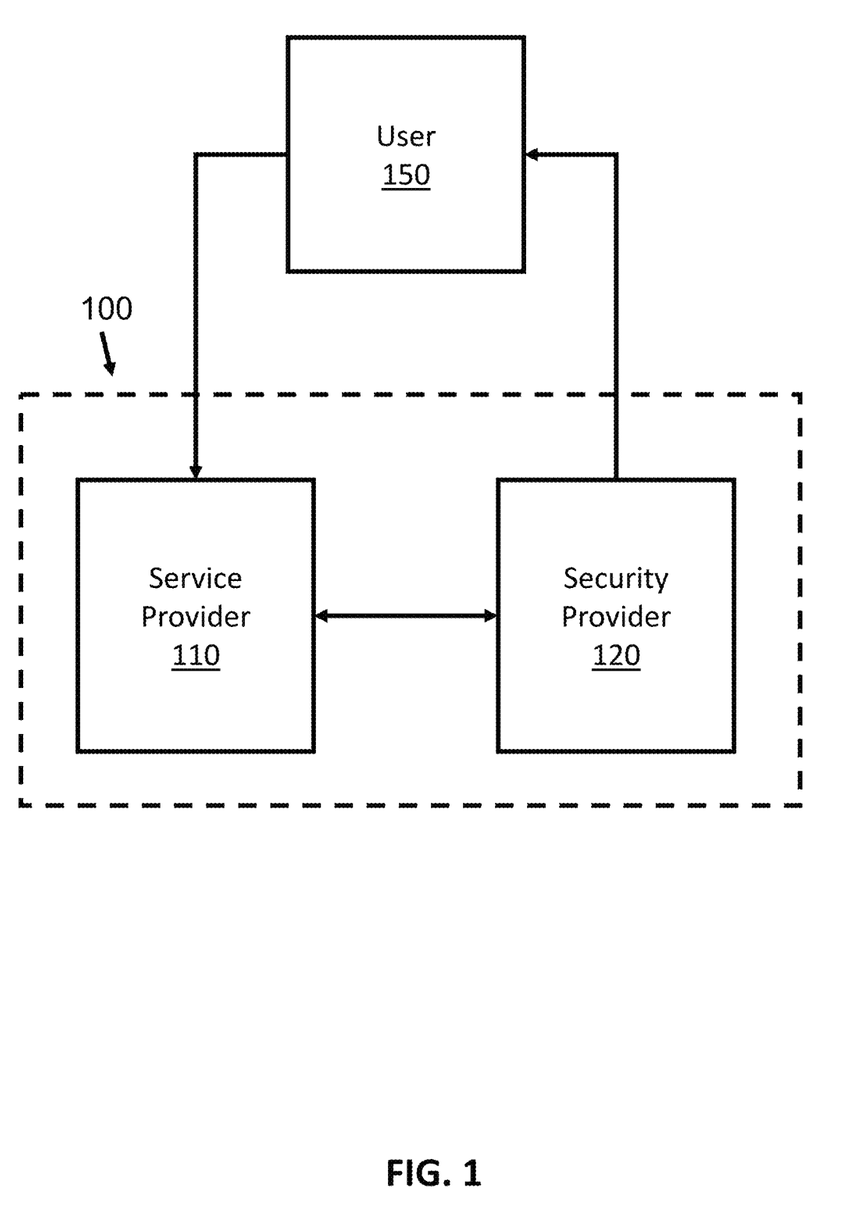
FIG. 1 is a block diagram of a security system according to aspects of the present disclosure.

Now referring to FIG. 1, illustrated is a security system 100 according to various aspects of the present disclosure. The security system 100 includes a service provider 110 and a security provider 120. The service provider 110 may be an email server, database, data server, cloud server, management server, shopping mall server, streaming server, news providing server, internet providing server, or any server, which provides various services to users. This list of servers is provided for example purposes only and may include other servers, which requires sensitive information to access the corresponding service. The sensitive information may be a password, passcode, passphrase, or any alphanumeric sequence with special characters.

In an aspect, the security provider 120 may be a stand-alone server separate from the service provider. In another aspect, the security provider 120 may be a software module, which can be incorporated or ported into the service provider 110. When incorporated into the service provider 110, the security provider 120 still provides security functionality and the service provider 110 may not be able to access data in the security provider 120. In other words, the security provider 120, as a software module, is securely encapsulated and separated from software modules of the service provider 110.

When a user 150 uses a user device (e.g., a computer, terminal, mobile device, smartphone, etc.) to access information saved in the service provider 110, sensitive information has to be provided to the service provider 110. Hereinafter, the user 150 is synonymously used as the user device because the user 150 has to use the user device to communicate with the service provider 110 and the security provider 120. When a third party other than the user 150 acquires the sensitive information, the third party can access the information in the service provider 110. To prevent this occurrence, the security system may verify the user 150 before allowing the user 150 to access the information. The security provider 120 may provide secure identity verification.

When the security provider 120 receives a request for identity verification from the service provider 110, the security provider 120 creates and sends a security code to the user 150 and the service provider 110. The user 150 then provides the received security code to the service provider 110. When the received code matches the security code, the service provider 110 verifies the user 150 and, in return, the user 150 is able to access the information.

Figure 2:
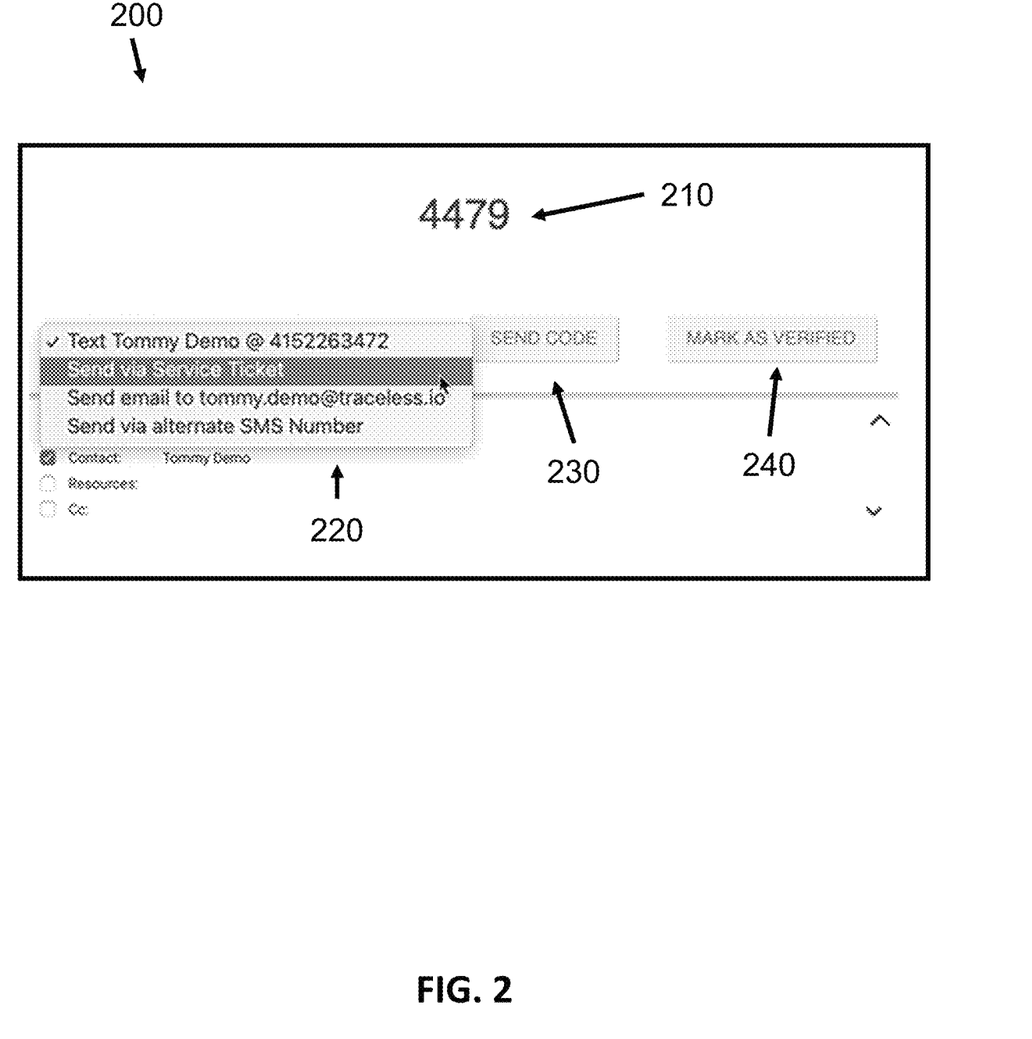
FIG. 2 is a graphical interface for identify verification according to various aspects of the present disclosure.

Now referring to FIG. 2, a graphical interface 200 is shown for identify verification according to aspects of the present disclosure. The security provider 120 may be integrated into the service provider 110 so that the graphical interface 200 may be used by both of the service provider 110 and the security provider 120.

The security provider 120 may automatically generate a security code 210, which may be a fixed length string of alphanumeric characters. The security code 210 may include one or more special characters. The graphical interface 200 includes a list 220 of communication methods to the user 150. For example, the list 220 may include a phone number, service ticket, email address, or short message service. Other communication means, which are readily appreciated by persons skilled in the art, may be included in the list 220. In an aspect, the phone number and the email address may be obtained from or provided by the service provider 110.

In a case where the security provider 120 is integrated into the service provider 110, an administrator of the service provider 110 may click the button 230 so that the security code 210 is transmitted to the user 150 via the communication method selected from the list 220 and to the service provider 110. The user 150 then sends the received code to the service provider 110, which determines whether the code received from the user 150 matches the security code received from the security provider 120. When they match, the user 150 is verified and the administrator of the service provider 110 may click the button 240 to mark the user 150 verified.

In a case where the security provider 120 is separately located from the service provider 110, an administrator of the security provider 120 may select a communication method from the list 220, or the security provider 120 may store the user's preference for the communication method and automatically select the user's preferred communication method. The security code 210 may be automatically sent to the user 150 without displaying the graphical interface 200. After verification of the user 150, the service provider 110 may automatically identify the user 150 as verified.

When the user 150 needs to change or update the sensitive information or forgets the sensitive information, the user 150 may send a request for sensitive information to the service provider 110. To verify the user 150, the service provider 110 sends a notification of the request to the security provider 120. In response to the notification, the security provider 120 creates and sends a security code to the user 150 and the service provider 110. After confirming that the code received from the user 150 matches the security code, the service provider 110 may send the sensitive information to the user 150. Instead of sending the sensitive information directly to the user 150, the service provider 110 may send the sensitive information to the security provider 120.

Figure 3:
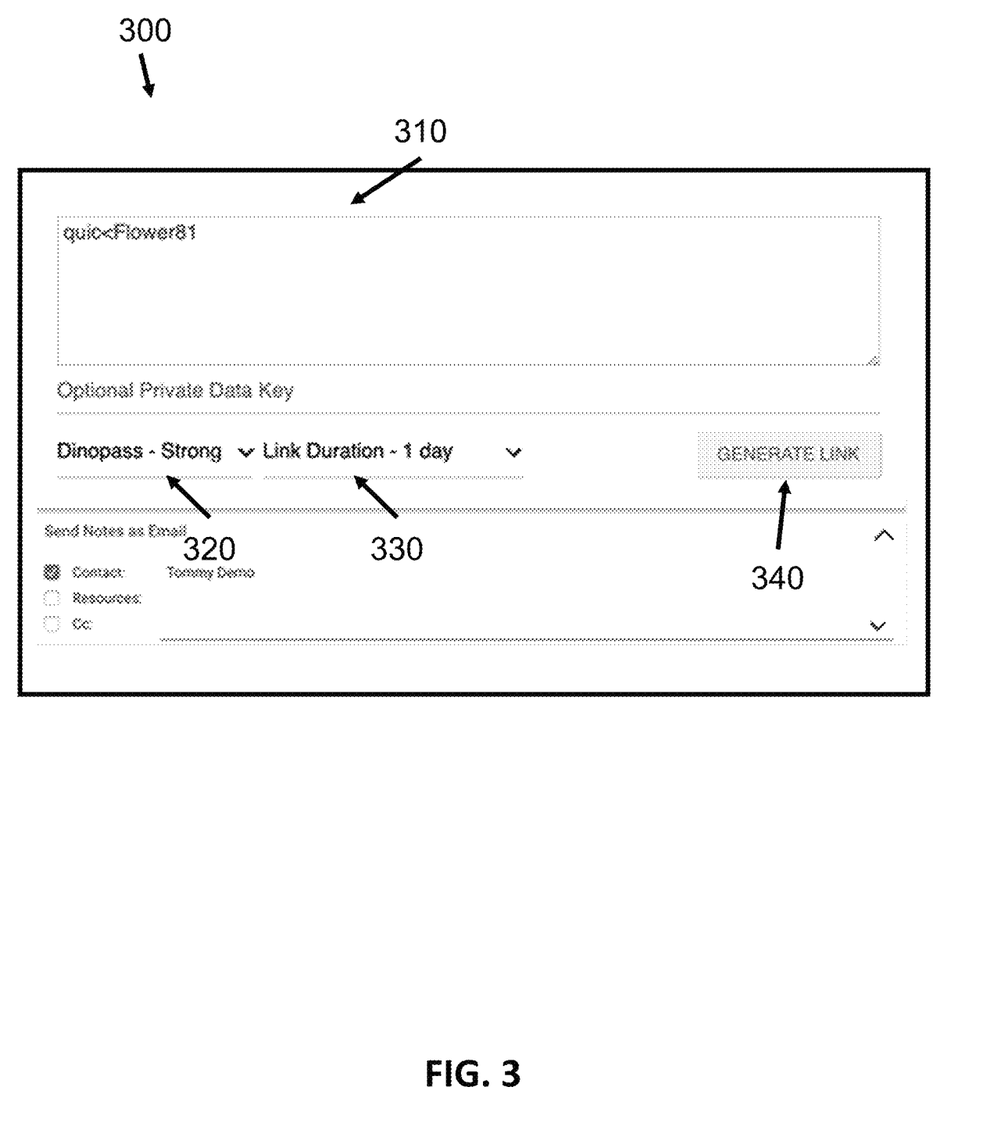
FIG. 3 is a graphical interface for sensitive data link according to various aspects of the present disclosure.

Now referring to FIG. 3, a graphical interface 300 is shown which may be displayed when the security provider 120 is integrated into the service provider 110. The graphical interface 300 may include a field 310 for sensitive information. The field 310 may receive any alphanumeric characters and special characters. The sensitive information may be a new/current password, an access code, serial number for registering software application, or any other information, which allows an access to information. This sensitive information may be automatically generated or manually made by the administrator of the service provider 110.

The graphical interface 300 may include a generating method 320 for the sensitive information. The user 150 may have determined which generating method 320 is to be used or the administrator of the service provider 110 may manually or automatically select the generating method. Further, the level of security may be selected among weak, middle, and strong. The graphical interface 300 also includes a duration 330 of the sensitive data link. The duration 330 may include predetermined minutes, hours, days, months, and years, or may be manually entered by the administrator of the service provider 110. When a button 340 is selected or clicked, a sensitive data link is generated and sent to the user 150. The sensitive data link may be clicked or copied and pasted into a web browser, allowing the user 150 to see the sensitive data as inputted in the field 310. In an aspect, when the user 150 clicks the sensitive data link, the user 150 may be notified that the sensitive data may be viewed only once.

The selected duration dictates when the sensitive data link expires. For example, when the selected duration is 5 minutes, the sensitive data link expires after 5 minutes.

The sensitive data link may be a self-destructing link, meaning that the sensitive data link is no longer valid when a certain condition is met. For example, the condition may be a one time view. Specifically, when the user 150 views the sensitive data link once, the sensitive data link becomes no longer valid regardless of the selected duration. Thus, when the sensitive data link is refreshed, the user 150 may be notified that the sensitive data link is not accessible.

In an aspect, when the security provider 120 is separate from the service provider 110, the graphical interface 300 may not be shown and the sensitive data link may be automatically generated and sent to the user 150. Specifically, when the service provider 110 sends the sensitive information to the security provider 120, the security provider 120 automatically generates a sensitive data link with preselected duration and sends the sensitive data link to the user 150.

Since the sensitive information is not sent to the user 150 via email or text message by the service provider 110, no sensitive information is ever left at rest in the email server or text message server of the service provider 110.

In an aspect, the sensitive data link shows the user 150 a storage place where the sensitive data is stored. The storage for the sensitive data may not be the service provider 110 and the security provider 120. In other words, the sensitive data is not saved in the service provider 110 and the security provider 120. Further, the sensitive data link becomes invalid after the user 150 views it once or after the selected duration. In this way, the sensitive data is not left at rest so that unauthorized or unverified users cannot access the sensitive data.

In another aspect, the service provider 110 may store all events related to the request for sensitive information from the user 150 in a service ticket as internal notes. Nevertheless, the sensitive information is not saved in the service ticket by the service provider 110.

Figure 4:
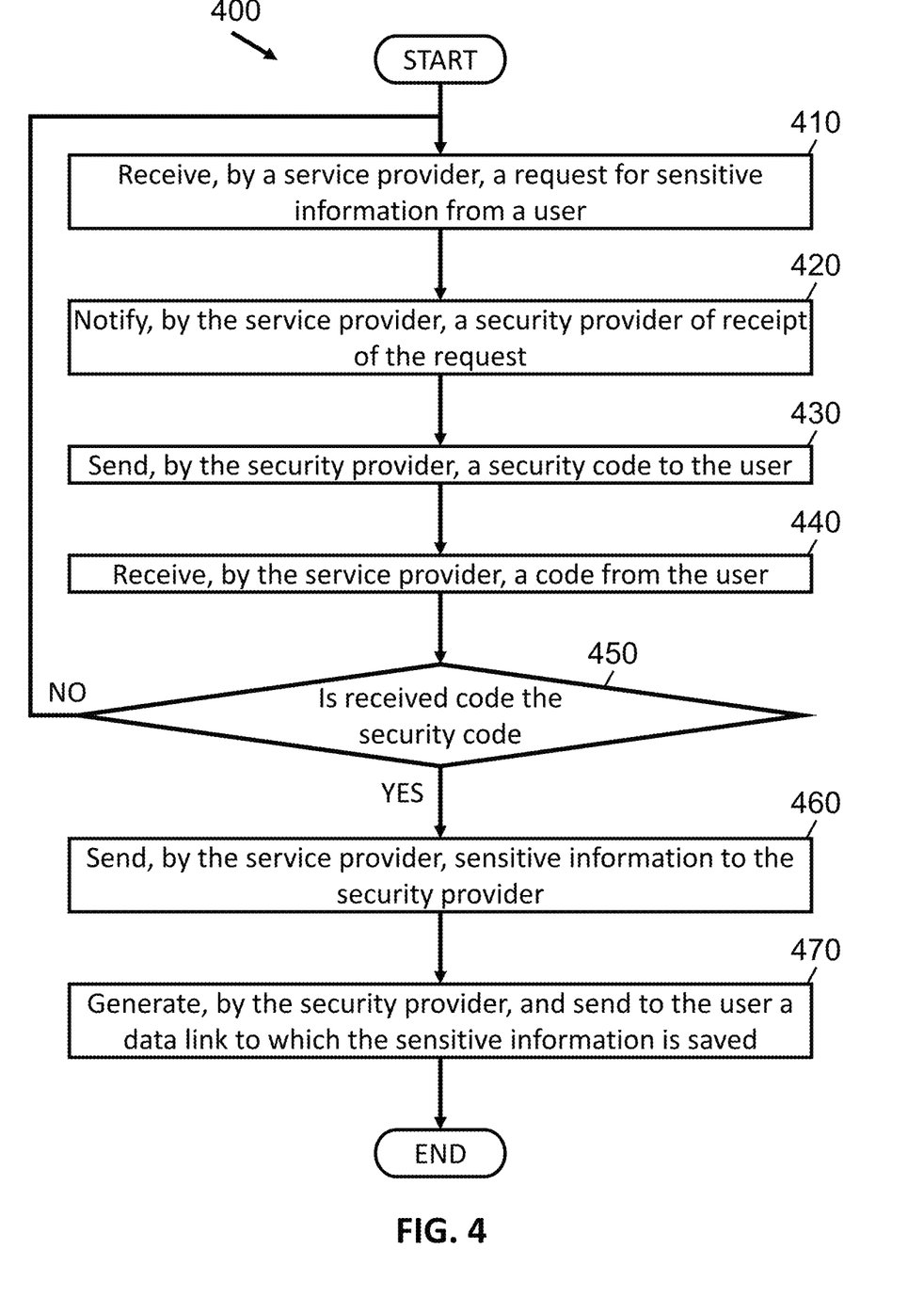
FIG. 4 is a flow diagram for a security method according to various aspects of the present disclosure.

Now referring to FIG. 4, a flowchart illustrating a security method 400 is shown according to various aspects of the present disclosure. The security method 400 may be performed among a service provider, a security provider, and a user to verify the user and to provide sensitive information to the user. The service provider may be a server, and the security provider may be a software module, which can be integrated into the service provider. Or the security provider may be another server, separate and different from the service provider.

When a user needs sensitive information (e.g., password, passcode, serial number, etc.), the user sends a request for the sensitive information to the service provider in step 410.

In step 420, the service provider notifies the security provider of the received request. In response to the notification, the security provider generates a security code and sends the code to the service provider and the user in step 430. The security code may be a series of numbers, alpha-numerical characters, or a figure. The list of security codes is not exhaustive and may include other items readily appreciated by a person having skill in the art.

The service provider prompts the user to enter the security code or select a figure. The user enters the security code or selects a figure, and the service provider receives the code in step 440. The service provider determines whether the code received from the user matches the security code received from the security provider in step 450.

In a case when it is determined that the received code from the user does not match the security code, the security method 400 returns back to step 410 or may be ended to prevent another try by the user. Thus, the mismatch brings the user back to the start of the security method 400.

In a case where it is determined that the received code from the user matches the security code, the service provider may send the sensitive information to the security provider in step 460. The security provider then generates and sends to the user a sensitive data link, which may be a hyperlink to a storage of a third party server in step 470. The sensitive information may be saved at the storage place to which the sensitive data link hyperlinks. The third party server is neither the service provider nor the security provider. Further, the sensitive data link is a self-destructing hyperlink. In other words, the sensitive data link expires when the user views the sensitive information of the sensitive data link or when the preselected duration has passed.

In an aspect, the sensitive data link may be password-protected. To add further security, the security provider may send a password to the user separately from sending the sensitive data link.

Figure 5:
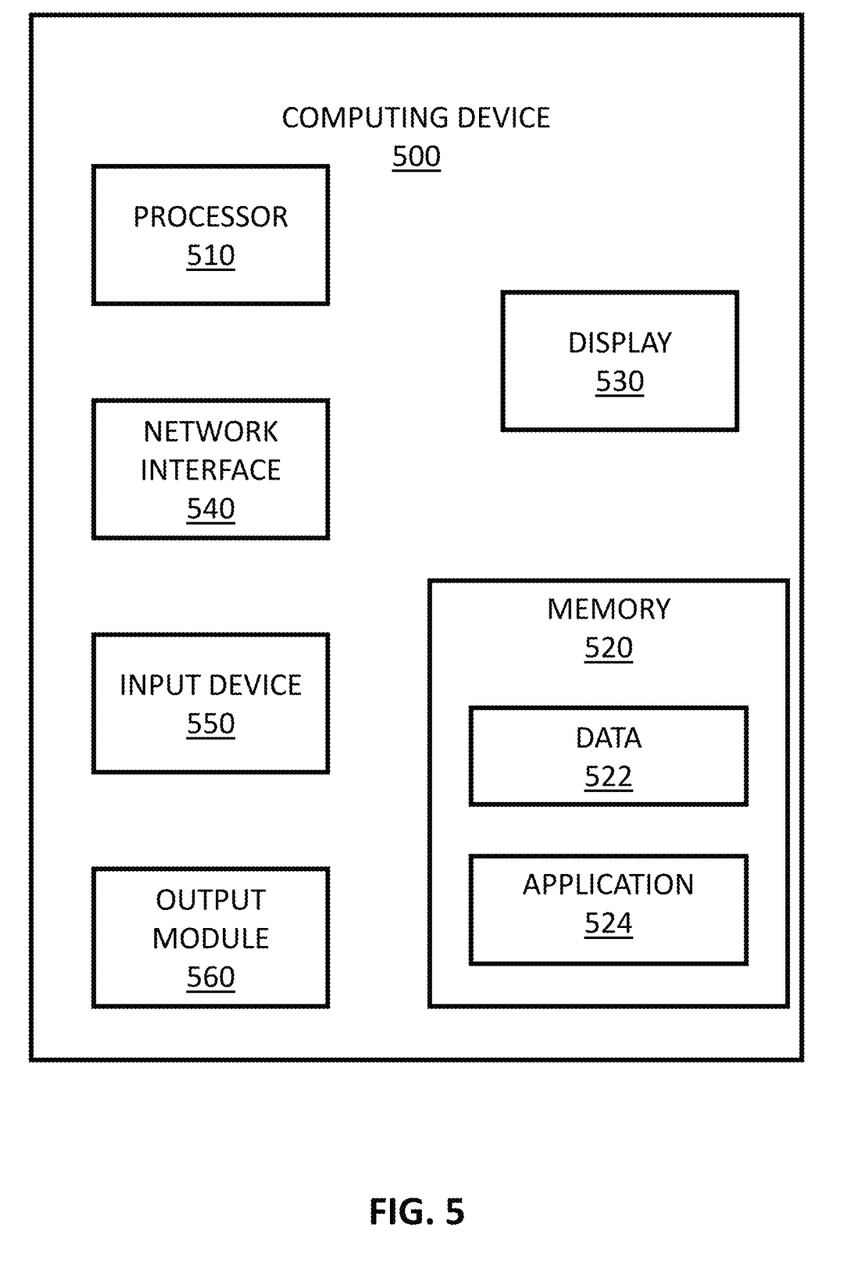
FIG. 5 is a block diagram of a computing device according to various aspects of the present disclosure.

Turning now to FIG. 5, a block diagram is provided for a computing device 500, which can be the service provider 110 and the security provider 120 of FIG. 1. The computing device 500 may include a processor 510, a memory 520, a display 530, a network interface 540, an input device 550, and/or an output module 560. The memory 520 may include any non-transitory computer-readable storage media for storing data and/or software that is executable by the processor 510 and which controls the operation of the computing device 500.

In an aspect, the memory 520 may include one or more solid-state storage devices such as flash memory chips. Alternatively, or in addition to the one or more solid-state storage devices, the memory 520 may include one or more mass storage devices connected to the processor 510 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 510. That is, computer-readable storage media may include non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid-state memory technology, CD-ROM, DVD, Blu-Ray or other optical storage, magnetic cassettes, magnetic tape, magnetic disk storage or other magnetic storage devices, or any other medium which can be used to store the desired information, and which can be accessed by the computing device 500.

The memory 520 may store application 524 (e.g., a security code generator (not shown) of the security provider 120 of FIG. 1) and/or data 522 (e.g., communication methods for the user). The application 524 may, when executed by processor 510, perform transmitting a security code, verifying a user, or any other operations as described above. In an aspect, the application 524 will be a single software program having all of the features and functionality described in the present disclosure. In another aspect, the application 524 may be two or more distinct software programs providing various parts of these features and functionality. Various software programs forming part of the application 524 may be enabled to communicate with each other and/or receive and transmit codes and a sensitive data link. The application 524 communicates via a user interface to present visual interactive features to the administrator on the display 530. For example, the graphical illustrations may be outputted to the display 530 to present graphical illustrations as shown in FIGS. 2 and 3.

The application 524 may include a sequence of process-executable instructions, which can perform any of the herein described methods, programs, algorithms or codes, which are converted to, or expressed in, a programming language or computer program. The terms "programming language" and "computer program," as used herein, each includes any language used to specify instructions to a computer, and includes (but is not limited to) the following computer languages and their derivatives: Assembler, BASIC, batch files, BCPL, C, C+, C++, COBOL, Delphi, Fortran, Java, JavaScript®, machine code, intermediate language(s), operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The processor 510 may be a general purpose processor, a specialized graphics processing unit (GPU) configured to perform specific graphics processing tasks or parallel processing while freeing up the general purpose processor to perform other tasks, and/or any number or combination of such processors, digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure(s) or any other physical structure(s) suitable for implementation of the described operations. Also, the techniques could be fully implemented in one or more circuits or logic elements.

The display 530 may be touch-sensitive and/or voice-activated, enabling the display 530 to serve as both an input and output device. Alternatively, a keyboard (not shown), mouse (not shown), or other data input devices may be employed. The network interface 540 may be configured to connect to a network such as a local area network (LAN) consisting of a wired network and/or a wireless network, a wide area network (WAN), a wireless mobile network, a Bluetooth network, and/or the internet.

For example, the computing device 500 may receive, through the network interface 540. The computing device 500 may receive updates to its software, for example, the application 524, via the network interface 540. The computing device 500 may also display notifications on the display 530 that a software update is available.

The input device 550 may be any device by means of which a user may interact with the computing device 500, such as, for example, a mouse, keyboard, or voice interface. The output module 560 may include any connectivity port or bus, such as, for example, parallel ports, serial ports, universal serial busses (USB), or any other similar connectivity port known to those skilled in the art. In an aspect, the application 524 may be installed directly on the computing device 500 or via the network interface 540. The application 524 may run natively on the computing device 500, as a web-based application in a cloud via the network interface 540, or any other format known to those skilled in the art.

The various aspects disclosed herein are examples of the disclosure and may be embodied in various forms. Although certain embodiments herein are described as separate embodiments, each of the embodiments herein may be combined with one or more of the other embodiments herein. It should also be understood that, depending on the example, certain acts or events of any of the processes or methods described herein may be performed in a different sequence, may be added, merged, or left out altogether (e.g., all described acts or events may not be necessary to carry out the techniques). In addition, specific structural and functional details disclosed herein are not to be interpreted as limiting, but as a basis for the claims and as a representative basis for teaching one skilled in the art to variously employ the present disclosure in virtually any appropriately detailed structure.

What is claimed is:

1. A method for sending sensitive information, the method comprising:
   receiving, by a service provider, a request for sensitive information from a user;
   upon receipt of the request, sending, by a security provider, a security code to the user;
   receiving, by the service provider, a code from the user;
   verifying, by the service provider, the user when the received code matches the security code;
   sending, by the service provider, the sensitive information to the security provider after the user is verified; and
   providing, by the security provider, a sensitive data link to the user,
   wherein the sensitive data link includes the sensitive information and expires after the sensitive data link is viewed once.

2. The method according to claim 1, wherein the sensitive information is not accessible when the sensitive data link is expired.

3. The method according to claim 1, wherein the security code is sent to the user via an email, short message service, or service ticket.

4. The method according to claim 3, wherein the code is sent via the service ticket to an email address outside of the service provider.

5. The method according to claim 1, wherein the sensitive data link expires after a duration selected by the service provider.

6. The method according to claim 1, wherein the sensitive data link includes a password to access the sensitive information.

7. The method according to claim 6, wherein the password is sent to the user separately from the sensitive data link.

8. The method according to claim 1, further comprising:
   creating, by the security provider, the sensitive data link to a third party different from the service provider and the security provider.

9. The method according to claim 8, wherein the sensitive information is temporarily saved at the third party while the sensitive data link is not expired.

10. A security system for sending sensitive information, the security system comprising:
    a security provider configured to send a security code to a user and send a sensitive data link to the user; and
    a service provider including:

a memory including one or more programs; and a processor configured to execute the one or more programs to:
- receive a request for sensitive information from the user;
- verify the user when a code received from the user matches the security code; and
- send the sensitive information to the security provider after the user is verified, wherein the sensitive data link includes the sensitive information and expires after the sensitive data link is viewed once.

11. The security system according to claim 10, wherein the security provider is integrated into the service provider.

12. The security system according to claim 10, wherein the sensitive information is not accessible when the sensitive data link is expired.

13. The security system according to claim 10, wherein the security provider sends the security code to the user via an email, short message service, or service ticket.

14. The security system according to claim 13, wherein the security provider sends the code via the service ticket to an email address outside of the service provider.

15. The security system according to claim 10, wherein the sensitive data link expires after a duration selected by the service provider.

16. The security system according to claim 10, wherein the sensitive data link includes a password to access the sensitive information.

17. The security system according to claim 16, wherein the password is sent to the user separately from the sensitive data link.

18. The security system according to claim 10, wherein the security provider is further configured to create the sensitive data link to a third party different from the service provider and the security provider.

19. The security system according to claim 18, wherein the sensitive information is temporarily saved at the third party while the sensitive data link is not expired.

20. A non-transitory computer-readable medium including one or more programs that, when executed by a computer, perform a method for sending sensitive information, the method comprising:
- receiving a request for sensitive information from a user;
- upon receipt of the request, sending, by a security provider, a security code to the user;
- receiving a code from the user;
- verifying the user when the received code matches the security code;
- sending the sensitive information to the security provider after the user is verified; and
- providing, by the security provider, a sensitive data link to the user, wherein the sensitive data link includes the sensitive information and is expired after the sensitive data link is viewed once.

* * * * *